(12) United States Patent
Granström et al.

(10) Patent No.: US 8,924,476 B1
(45) Date of Patent: Dec. 30, 2014

(54) RECOVERY AND FAULT-TOLERANCE OF A REAL TIME IN-MEMORY INDEX

(75) Inventors: Johan Georg Granström, Zurich (CH);
Sai Suman Cherukuwada, Adliswil (CH); Klas Olof Daniel Andersson, Stockholm (SE)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/435,894

(22) Filed: Mar. 30, 2012

(51) Int. Cl.
*G06F 15/16* (2006.01)
*G06F 17/30* (2006.01)

(52) U.S. Cl.
CPC .... *G06F 17/30044* (2013.01); *G06F 17/30017* (2013.01); *G06F 17/30008* (2013.01)
USPC ........................................................ 709/204

(58) Field of Classification Search
CPC .................... G06F 17/30008; G06F 17/30044; G06F 17/30017
USPC ........................................................ 709/204
See application file for complete search history.

(56) References Cited

U.S. PATENT DOCUMENTS

| | | | |
|---|---|---|---|
| 6,557,014 B1 * | 4/2003 | Cellis et al. ............................ | 1/1 |
| 2008/0034003 A1 * | 2/2008 | Stakutis et al. ................ | 707/200 |
| 2008/0183767 A1 * | 7/2008 | Zhu et al. ....................... | 707/200 |
| 2009/0300607 A1 * | 12/2009 | Ferris et al. ........................ | 718/1 |
| 2009/0323658 A1 * | 12/2009 | Balasubramanian et al. | 370/338 |
| 2010/0151859 A1 * | 6/2010 | Hsu ................................. | 455/434 |
| 2010/0249541 A1 * | 9/2010 | Geva et al. ..................... | 600/301 |
| 2011/0222787 A1 | 9/2011 | Thiemert et al. | |

FOREIGN PATENT DOCUMENTS

WO        WO 2005041600 A1 *   5/2005

OTHER PUBLICATIONS

Bornea, et al., "Semi-Streamed Index Join for Near-Real Time Execution of ETL Transformations," 12 pages.
Rao, S.Srikanth, et al., "Indexing-Duplicate Videos Detection in a Database," Kakatiya Institute of Technology & Science, 12 pages.

* cited by examiner

*Primary Examiner* — Vivek Srivastava
*Assistant Examiner* — Nicholas Celani
(74) *Attorney, Agent, or Firm* — Amin, Turocy & Watson, LLP

(57) ABSTRACT

Techniques for recovery and fault-tolerance of a real time in-memory index are presented. A queue management component controls a queue component to have it communicate respective data segments of a data stream to respective partitions of a repository, based on a randomizing function, a stream ID of the data stream, and respective segment numbers of the respective segments. The repository stores data streams for a defined period of time. A driver component distributes queries to the partitions of the repository to request data stream segments, and the repository can provide segments that have not yet expired. The driver component aggregates the results to reproduce the data stream, which can be provided to a requesting client. When a partition is recovering from being offline, the partition can request that the queueing system re-deliver data segments over a specified time period, and the queue component can re-deliver the desired data segments.

20 Claims, 12 Drawing Sheets

RECOVERY AND FAULT-TOLERANCE OF A REAL TIME IN-MEMORY INDEX

TECHNICAL FIELD

This disclosure relates generally to data processing, and more specifically to recovery and fault-tolerance of a real time in-memory index.

BACKGROUND

Streaming data has become more popular and useful in recent years due in part to improvements in data compression techniques, which has made the transmission of data via a network increasingly more feasible, and due in part to improvements in memory technology (e.g., storage and processing). Commercial video-content providers and video-sharing sites have helped to popularize the streaming of data.

While streaming of video content is one relatively popular use for streaming data, other types of data can be streamed as well. For example, it can be desirable to stream and/or store data representative of media content, such as video or audio content. One type of data that can be representative of video content is video (or data) patterns or structures (e.g., video fingerprints) that can be based on the video content. For example, unique features of digital video content can be extracted from the digital video content and can be stored as a video structure, such as a digital video fingerprint, that can be representative of and/or can facilitate identification of that digital video content. A digital video fingerprint can be highly compressed, as compared to the original digital video content, which can allow for lower storage and/or streaming costs than that associated with uncompressed or less compressed data.

While there have been improvements in technology relating to data streaming, there are still a number of challenges in being able to desirably stream data content, for example, via a network (e.g., the Internet). For example, there can be times when it can be desirable to take a repository containing data offline to perform general maintenance or repairs on the repository. Also, there can be instances where a network outage may occur, which can make the repository unavailable to a client requesting streaming of data. It can take time for a repository, or portion thereof, to recover after being made available again (e.g., after being put back online, after a network outage is rectified, etc.). The unavailability of and recovery time for a repository may cause an undesirable disruption to, or may otherwise negatively impact, streaming of the data due in part to, for example, low latency requirements that may be associated with data streaming.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems, methods, computer products, techniques, etc., disclosed herein relate to data processing. Disclosed herein is a system that includes a queue component that distributes respective messages of a plurality of messages to respective partitions of a set of partitions of a repository, wherein the respective messages include respective data segments of a data stream. The system also includes a queue management component that manages distribution of the respective messages to the respective partitions of the repository based at least in part on respective segment numbers and respective stream identifiers associated with the respective messages.

Also disclosed herein is a method that includes employing at least one processor to facilitate execution of code instructions retained in at least one memory device. The at least one processor, in response to execution of the code instructions, performs acts comprising: distributing respective messages of a plurality of messages via a queue to respective partitions of a plurality of partitions of a repository, wherein the respective messages include respective data segments of a data stream; and controlling distribution of the respective messages to the respective partitions of the repository as a function of respective segment numbers and respective stream identifiers of the respective messages.

Further disclosed herein is a computer program product that includes a computer-readable storage medium storing computer-executable instructions that, in response to execution, cause a system including at least one processor to perform operations. The operations include providing respective messages of a plurality of messages via a queue to respective partitions of a plurality of partitions of a repository, wherein the respective messages include respective data segments of a data stream; and managing distribution of the respective messages to the respective partitions of the repository as a function of respective segment numbers and respective stream identifiers associated with the respective data segments.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
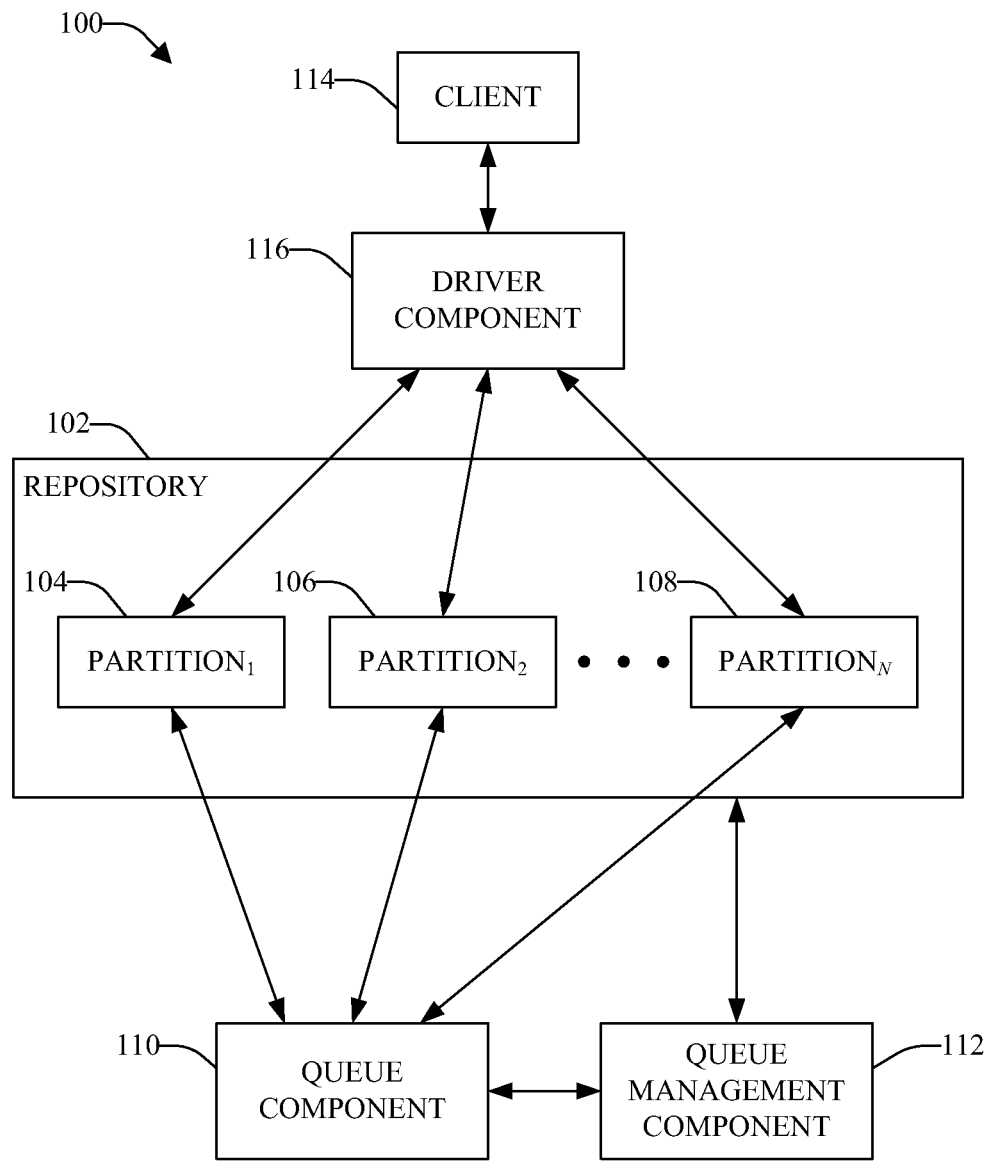
FIG. 1 illustrates a block diagram of an example system that can use a queue component to distribute data segments of a data stream to partitions of a repository in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Streaming of data has become more popular and useful in recent years due in part to improvements in data compression techniques making transmission of video content via a network (e.g., the Internet) increasingly more feasible, and due in part to improvements in memory technology (e.g., storage and processing). While streaming of video content is one relatively popular use for streaming data, other types of data can be streamed as well. For example, it can be desirable to stream and/or store data that can be representative of media content, such as video or audio content. One type of data that can be representative of video content is video (or data) patterns or structures (e.g., digital video fingerprints) that can be based on the digital video content. For example, unique features of digital video content can be extracted from the digital video content and can be stored (e.g., in a repository) as a video structure, such as a digital video fingerprint, that can be representative of and/or can facilitate identification of the digital video content that the video structure represents. A digital video fingerprint may be highly compressed, as compared to the original digital video content, which can allow for lower storage and/or streaming costs than that associated with uncompressed or less compressed data.

While streaming of data has become more popular and useful, there are still a number of challenges in being able to desirably stream data, for example, via a network. For example, there can be times when it can be desirable to take a repository containing data offline to perform general maintenance or repairs on the repository. Also, there can be instances where a network outage may occur, which can make the repository unavailable to a client requesting streaming of data. It can take time for a repository, or portion thereof, to recover after being made available again (e.g., after being put back online, after a network outage is rectified, etc.). The unavailability of and recovery time for a repository may cause an undesirable disruption to, or may otherwise negatively impact, streaming of data due in part to, for example, low latency requirements that may be associated with data streaming To that end, techniques for recovery and fault-tolerance of a real time in-memory index that can facilitate storing and streaming of data are presented. A queue management component can control delivery of messages, which each can comprise a respective data segment of a data stream, by a queue component to partitions of a repository. In some implementations, the data stream can be a unique video (or data) pattern, structure, and/or characteristic(s), such as a video fingerprint (e.g., video fingerprint in digital form), associated with a video stream. The queue management component can control the queue component to have the queue component communicate the respective data segments of a data stream to respective partitions of the repository, based at least in part on a randomizing function, a unique stream ID associated with the data stream, and respective segment numbers associated with the respective data segments. For each data segment of a data stream, the queue component can deliver a data segment to one partition, in accordance with the randomizing function.

The repository can include a plurality of partitions that respectively can store data segments of a data stream based at least in part on a randomizing function. The repository can store each of the data streams for a defined period of time (e.g., time window, such as, for example, a day, a week, a month, etc.) based at least in part on a stream expiry time of a data stream. The repository can identify (e.g., determine, calculate) stream expiry time for a data stream based at least in part on a time when the last segment for the data stream was received by the repository.

A driver component can be associated with the repository to facilitate requesting data streams to provide to one or more clients that can request a desired data stream(s). A client (e.g., communication device) can be, for example, a computer, a mobile phone (e.g., smart phone), a digital video recorder and/or player, a set-top box, an electronic tablet, an electronic gaming device, an Internet Protocol Television (IPTV), an application-specific computing device (e.g., communication device designed specifically for data streaming), or a combination of communication devices and/or peripheral devices.

When a client desires a data stream, the client can request the data stream, which can be received by the driver component. The driver component can distribute queries to respective partitions of the repository to request data stream segments of the requested data stream. In response, the respective partitions of the repository can provide data segments, for example, of a data stream that has not yet expired. The driver component can receive the query results, which can include the requested data segments. The driver component can aggregate the data segments to reproduce the requested data stream. The driver component can provide the reproduced data stream as an output, for example, to a client, which requested the data stream. The architecture of this disclosure, including the queue component, queue management component, repository, driver component, etc., can enable a client to request all or any portion of a data stream, which has not expired, from the driver component, and, in response to a request by the driver component, the repository can provide the data stream to the driver component for delivery to the client.

In some instances, a partition of the repository may be taken offline (e.g., for maintenance or repair) for a period of time or the partition may otherwise be unavailable to the queue component, the driver component, etc., due to, for example, a network outage associated with a communication network associated with the repository. In some implementations, when a partition of the repository is recovering from being offline or otherwise unavailable, the partition can request (e.g., via a "seek back" request) that the queueing system, using the queue component (e.g., executing a "seek back" operation), re-deliver one or more data segments that had previously been sent by the queue component to the partition over a specified time period. In response to the request from the partition, the queue management component can control operations of the queue component to have the queue component re-deliver the requested data segments to the partition.

It is to be appreciated that various implementations described in this disclosure relate to streaming of data in the form of video (or data) patterns or structures, such as digital video fingerprints associated with (e.g., representative of) video content (e.g., video streams). However, this disclosure is not so limited, as in accordance with one or more implementations, the data can include virtually any type of data, such as digital documents that contain information, video content, visual images (e.g., still image, moving image), audio content, user data, etc.

Referring now to the drawings, FIG. 1 illustrates a block diagram of an example system 100 that can use a queue component (e.g., message queue) to distribute data segments of a data stream to partitions of a repository in accordance with various aspects and implementations described herein. The system 100 can be used to distribute respective data segments of a plurality of data segments of the data stream to respective partitions of a repository to facilitate recovery and fault-tolerance of a real time in-memory index.

In some implementations, the data can be video (or data) patterns or structures that can be associated with (e.g., representative of) digital media content, such as, for example, video content or audio content. The video (or data) patterns or structures can be or can include, for example, digital video fingerprints, that can include features (e.g., unique features) of the digital media content, which can be identified in or extracted from the digital media content. In certain implementations, the data can be a relatively highly compressed version of the digital media content.

The system 100 can include a repository 102 that can comprise a plurality of partitions, including partition$_1$ 104, partition$_2$ 106, up through partition$_N$ 108, that can be used to store data segments of data streams and/or other data (e.g., other portions of a message, metadata, etc.), where N can be virtually any desired integer number. The repository 102 can modify the number of partitions N to, for example, add or remove partitions, and/or place a partition in an online state or offline state (e.g., temporarily place a partition in an offline state to perform maintenance or repairs on that partition).

The system 100 can contain a queue component 110 that can be associated with (e.g., communicatively connected to) the repository 102 and can deliver (e.g., transmit, distribute, etc.) data segments to partitions of the repository 102, as more fully disclosed herein. The queue component 110 can be associated with (e.g., communicatively connected to) a queue management component 112 that can control operations of the queue component 110 to facilitate distribution of messages, including data segments, to partitions (e.g., partitions 104, 106, 108, . . . ) of the repository 102.

The queue component 110 can distribute messages, which can include respective data segments of data streams, to respective partitions (e.g., partitions 104, 106, 108, . . . ) of the repository 102, based at least in part on a unique stream identifier (ID) associated with a data stream and respective segment numbers of respective data segments. In some implementations, the queue component 110 can distribute each data segment of a data stream to exactly one partition based at least in part on a unique stream identifier (ID) associated with that data stream and respective segment numbers of respective data segments of that data stream, without regard to the payloads of the respective data segments. The queue component 110 can include one or more queues that each can queue and distribute data segments of data streams. In certain implementations, the queue component 110 can include multiple queues that can operate sequentially or in parallel to queue and distribute data segments of data streams.

The queue management component 112 can assign a unique stream ID to a data stream. The queue management component 112 also can divide the data stream into a plurality of data segments. The queue management component 112 can assign respective segment numbers to respective data segments of the data stream. The queue management component 112 can determine (e.g., identify, calculate) a routing number (e.g., partition number) for a message as a function of the randomizing function based at least in part on a unique stream ID associated with a data stream and a segment number of the data segment associated with the message.

In some implementations, an equation for determining the routing number can be routing_nr=randomize(stream_ID, segment_number), where routing_nr is the routing number, randomize(parameter x, parameter y) is the randomizing function, stream_ID (e.g., parameter x) is the stream ID associated with a data stream, and segment_number (e.g., parameter y) is the segment number associated with the data segment. The routing number can be between, for example, 0 (inclusive) and a defined value, such as $2^{64}$ (exclusive) (e.g., from 0 to ($2^{64}-1$)). For N partitions in the repository 102, the queue management component 112 can control distribution of messages by the queue component 110 to have the queue component 110 distribute messages, including associated data segments, to a partition, such as partition K, for which M*K≤routing_nr<M*(K+1), where M can be the defined value (e.g., upper bound of M) divided by N (e.g., $2^{64}$ divided by N), rounded upwards to the next whole number. If N is not a number based on a power of two (e.g., when the defined value is based on a power of 2) or otherwise (e.g., when the defined value is not based on a power of 2) if M is not equal to a whole number when the defined value is divided by N, the last partition of the repository 102 potentially may receive a smaller portion (e.g., slightly smaller portion) of the data segments as compared to other partitions of the repository 102.

The repository 102 can store each of the data streams for a defined period of time (e.g., time window, such as, for example, a day, a week, a month, etc.) based at least in part on a stream expiry time of a data stream. The repository 102 can identify (e.g., determine, calculate) stream expiry time for a data stream based at least in part on a time when the last data segment for the data stream was received by the repository 102. After a defined period of time has expired for a data stream, the repository 102 can remove (e.g., discard, delete, overwrite, etc.) the data stream from the repository 102 (e.g., remove data segments of the data stream from various partitions of the repository 102).

At various times, one or more clients, including client 114, can desire to request a data stream from the repository 102. A client can include, for example, a computer, a phone (e.g., a mobile phone and/or smart phone), an electronic tablet, a digital video recorder and/or player, a set-top box, an electronic gaming device, an Internet Protocol Television (IPTV), an application-specific computing device (e.g., communication device designed specifically for video streaming), or a combination of communication devices and/or peripheral devices.

To facilitate providing a data stream to a client 114, the system 100 can include a driver component 116 that can be associated with (e.g. communicatively connected to) the client 114 and the repository 102, and can obtain the data stream from the repository 102 to provide the data stream to the client 114. The driver component 116 can be communicatively connected to the client 114 or the repository 102 via a wired or wireless communication connection.

When a client 114 desires a data stream, the client 114 can communicate a request for the data stream to the driver component 116, which can receive the request. The driver component 116 can distribute queries to respective partitions (e.g., partitions 104, 106, 108, . . . ) of the repository 102 to request respective data stream segments of the requested data stream from the respective partitions. In response, the respective partitions (e.g., partitions 104, 106, 108, . . . ) retrieve the respective data segments from their respective data stores (e.g., respective portions of a data store(s)). The repository 102 can generate query results, which can include the respective data segments of the data stream, and can provide the query results to the driver component 116.

The driver component 116 can receive the query results, which can include the requested data segments of the data stream. The driver component 116 can aggregate and/or order the data segments to reproduce the requested data stream. The driver component 116 can provide the reproduced data stream as an output, for example, to the client 114 that requested the data stream. The driver component 116 can be stateless, and, as a result, can recover relatively quickly and can be replicated as many times as desired by the system 100. The architecture of this disclosure, including the queue component 110, queue management component 112, repository 102, driver component 116, etc., can enable a client 114 to request all or any portion of a data stream, which has not expired, via the driver component 116, and, in response to a request (e.g., a subset of queries) by the driver component 116, the repository 102 (e.g., the partitions of the repository 102) can provide the data stream to the driver component 116 for delivery to the client 114.

In some instances, a partition (e.g., partitions 104, 106, or 108, . . . ) of the repository 102 may be taken offline (e.g., for maintenance or repair) for a period of time or the partition may otherwise be unavailable to the queue component 110, the driver component 116, etc., due to, for example, a network outage associated with a communication network associated with the repository 102. In some implementations, when a partition (e.g., partitions 104, 106, or 108, . . . ) of the repository 102 is recovering from being offline (e.g., after being put back online) or otherwise unavailable, the partition can request (e.g., via a "seek back" request) that the queueing system, including the queue component 110 and/or queue management component 112 (e.g., executing a "seek back" operation), re-deliver one or more data segments that had previously been sent by the queue component 110 to the partition over a specified time period. In some implementations, the partition can request the queueing system to re-deliver one or more data segments that had previously been sent by the queue component 110 to the partition after the current time of the "seek back" request minus the expiry time of the data stream minus the maximum data stream length. In response to the request from the partition, the queue management component 112 can control operations of the queue component 110 to have the queue component 110 re-deliver the requested data segments to the partition of the repository 102.

As a result, in accordance with this disclosure, the architecture of this disclosure, including the queue component 110, queue management component 112, repository 102, driver component 116, etc., can operate without using any permanent backing store, as this disclosure can desirably operate using the message queueing back end associated with the queue component 110. One example benefit of this disclosure being able to operate without a permanent backing store is that, in accordance with this disclosure, data streaming jobs can be moved with relative ease in a cloud environment. Also, this disclosure, using the driver component and N-partition repository configuration, can be operated in one or more locations, using the same or substantially the same queueing back end (e.g., queue component, queue management component, etc.), which can thereby increase the scalability of this disclosure.

The various aspects of the queue component 110, queue management component 112, driver component 116, repository 102, etc., as described in this disclosure, can provide a number of benefits over conventional systems, methods, and techniques. For example, if some of the partitions (e.g., partitions 104, 106, or 108, . . . ) of the repository 102 are unavailable, the repository 102 can still provide desirable (e.g., meaningful) query results for data streams contained in the repository 102 to the driver component 116, as, in accordance with this disclosure, any missing segment(s) of a data stream can be pseudo-randomly distributed across the partitions of the repository 102. The driver component 116 can return a data stream based on those desirable query results to a client 114. As another example, in accordance with various aspects of this disclosure, if the number of partitions N of the repository 102 is changed (e.g., on a short-term or long-term basis), it is not necessary for the repository 102, or another component, to re-build the memory index of the repository 102. For instance, when the number of partitions N of the repository 102 is changed, the repository 102 can begin to use the new or now available partitions, and the repository 102 can update the number of partitions N for the previously available partitions of the repository 102. Also, this disclosure can distribute data segments of a data stream evenly, or at least substantially evenly, across the partitions (e.g., partitions 104, 106, or 108, . . . ) of the repository 102. For instance, for messages that respectively can include data segments of a data stream(s), at Q number of messages queued or distributed per second by the queue component 110, each partition of the repository 102 can have a received message frequency of Q/N or approximately Q/N. As, in accordance with this disclosure, data segments can be distributed by the queue component 110 to partitions of the repository 102 in a pseudo-random manner, the risk of a partition of the repository 102 receiving a larger fraction than 1/N messages (and thus, data segments) for an extended period of time can be relatively low or minimal. As a result, this disclosure can facilitate distributing data segments in a manner such that the data segments are not congested in time.

Figure 2:
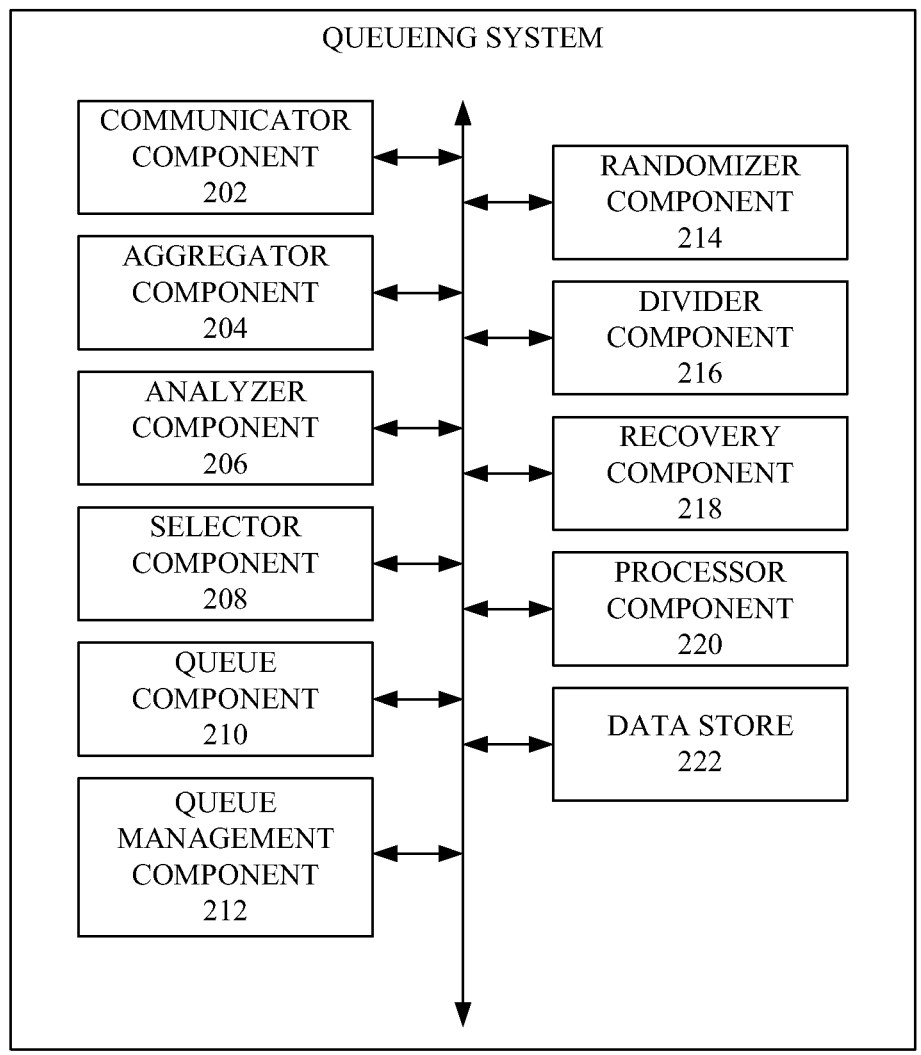
FIG. 2 depicts a block diagram of an example queueing system that can distribute data segments of a data stream to partitions of a repository in accordance with various aspects and implementations of this disclosure.

FIG. 2 depicts a block diagram of an example queueing system 200 that can distribute data segments of a data stream to partitions of a repository in accordance with various aspects and implementations of this disclosure. The queueing system 200 can distribute respective data segments of a data stream to respective partitions of a repository based at least in part on a unique stream ID associated with the data stream and respective segment numbers of the respective data segments, for example, using a randomizing function. In some implementations, the data can include video (or data) patterns or structures, such as digital video fingerprints, associated with digital media content (e.g., streamed video or audio content). In some implementations, the queueing system 200 can include a communicator component 202, an aggregator component 204, an analyzer component 206, and a selector component 208.

The communicator component 202 can be used to communicate (e.g., transmit, receive) information between the queueing system 200 and other components (e.g., repository, driver component, etc.). The information can include, for example, messages, data segments of a data stream (e.g., as part of messages), data (e.g., metadata, such as segment numbers, stream ID, etc.) associated with the data stream, requests for re-delivery of data segments (e.g., "seek back" requests), information relating to a change in a number of partitions of the repository, etc.

The aggregator component 204 can aggregate data received (e.g., obtained) from various entities (e.g., repository, driver component, etc.), data for analysis by the analyzer component 206, data for transmission to another entity, etc. The aggregator component 204 can correlate respective items of data based at least in part on type of data, source of the data, time or date the data was generated or received, stream ID, segment number, a data stream or a data segment to which the data relates, etc., to facilitate processing (e.g., analyzing of the data by the analyzer component 206) or communicating such data.

The analyzer component 206 can analyze data to facilitate determining which partition of the repository a data segment is to be distributed, determining which data segment(s) is to be re-delivered to a partition in response to a request for re-delivery (e.g., "seek back" request) associated with the partition, identifying a current number or a change in number of partitions of a repository, etc. Based at least in part on such data analysis, the analyzer component 206 can generate analysis results that can enable the queueing system 200 (e.g., queue management component 212) to determine which partition of the repository a data segment is to be distributed, determining which data segment(s) is to be re-delivered to a partition in response to a request for re-delivery (e.g., "seek back" request) associated with the partition, identifying a current number or a change in number of partitions of a repository, etc.

The selector component 208 can select items of data, an applicable data-segment distribution algorithm, a randomizing function, a data segment number, a stream ID, parameter values (e.g., segment-distribution parameter values), or other information, to facilitate distribution of data segments of a data stream(s) to the repository. For example, the selector component 208 can select a stream ID and a segment number to associate with a data segment of a data stream, a data stream for re-delivery to a partition of the repository as part of a recovery operation of the partition, one or more parameters, and/or one or more items of data, etc., relevant to distribution of data segments of a data stream to the repository.

The queueing system 200 also can include a queue component 210, a queue management component 212, a randomizer component 214, a divider component 216, and a recovery component 218. The queue component 210 can comprise one or more queues (e.g., physical or logical queues) to which messages, which can include data segments of a data stream (s), can be placed or stored for distribution to partitions of the repository. The queue component 210 can communicate the messages to the respective partitions with or without regard to order of the data segments of a data stream, as the respective data segments of a data stream can be associated with respective segment numbers so the order of the data segments of the data stream can be known by various entities (e.g., data segments, partitions, repository, driver component, etc.).

The queue management component 212 can control operations of the various components of the queueing system 200 to facilitate distribution of respective data segments of a data stream to respective partitions of a repository based at least in part on a unique stream ID associated with the data stream and respective segment numbers of the respective data segments, as more fully disclosed herein. For example, the queue management component 212 can control association (e.g., assignment) of a respective segment number and a stream ID to a respective data segment of a data stream. As another example, the queue management component 212 can control delivery (e.g., transmission or re-transmission (e.g., as part of a "seek back" operation)) of data segments by the queue component 210 to partitions of the repository.

The randomizer component 214 can comprise one or more randomizing functions that the queueing system 200 can use to facilitate identifying a partition of the repository to which a data segment is to be distributed by the queue component 210. The queue management component 212 and/or randomizer component 214 can operate to identify a partition to which a data segment of a data stream is to be distributed. The queue management component 212 can generate a routing number associated with the identified partition, based at least in part on the segment number, stream ID, and randomizing function, and can associate the routing number with the data segment to facilitate distribution of that data segment to the identified partition.

The divider component 216 can divide a data stream into a plurality of data segments for distribution to partitions of the repository. The data segments can be uniform or non-uniform in length of time, data size, etc.

The recovery component 218 can facilitate identifying (e.g., determining) which data segment(s) of a data stream(s) is to be re-delivered to a partition of the repository in response to a request for re-delivery of data segments (e.g., "seek back" request) associated with that partition. The request for re-delivery of data segments can relate to a specified time period (e.g. a time period the partition was unavailable), as more fully disclosed herein. The queue management component 212 can use information relating to the identification of a data segment(s) to be re-delivered to a partition of the repository to facilitate re-delivery of the data segment(s) by the queueing system 200. In some implementations, one or more components (e.g., queue component 210, randomizer component 214, divider component 216, recovery component 218, etc.) of the queueing system 200 can be part of the queue management component 212.

In some implementations, the queueing system 200 also can include a processor component 220 that can operate with the other components (e.g., communicator component 202, aggregator component 204, analyzer component 206, etc.) to facilitate performing the various functions of the queueing system 200. The processor component 220 can employ one or more processors, microprocessors, or controllers that can process data, such as information relating to distributing data segments of data streams, information relating to other operations of the queueing system 200, and/or other information, etc., to facilitate distributing data segments of data streams and/or performing other operations associated with the queueing system 200, as more fully disclosed herein. The processor component 220 can control or manage data flow between the queueing system 200 and other components (e.g., media source, media capture device, decoder component, data store, computer-readable storage media, etc.) associated with the queueing system 200.

The queueing system 200 also can include a data store 222 that can store data structures (e.g., user data, video (or data) patterns or structures (e.g., digital video fingerprints) representative of video content (e.g., video streams), metadata), instructions, procedures, and/or code structure(s) (e.g., modules, objects, hashes, classes) to facilitate performing or controlling operations associated with the queueing system 200. The data store 222 also can store information (e.g., randomizing function(s), segment numbers, stream IDs, a number of available partitions of the repository, etc.) relating to distributing data segments of data streams to partitions of the repository, and/or information relating to other operations of the queueing system 200, etc. The information stored in the data store 222 can facilitate distributing data segments of data streams to partitions of the repository, and performing or controlling other operations, associated with the queueing system 200. The processor component 220 can be coupled (e.g., through a memory bus) to the data store 222 in order to store and retrieve information desired to operate and/or confer functionality, at least in part, to the components (e.g., communicator component 202, aggregator component 204, analyzer component 206, etc.) of the queueing system 200, and/or substantially any other operational aspects of the queueing system 200.

Figure 3:
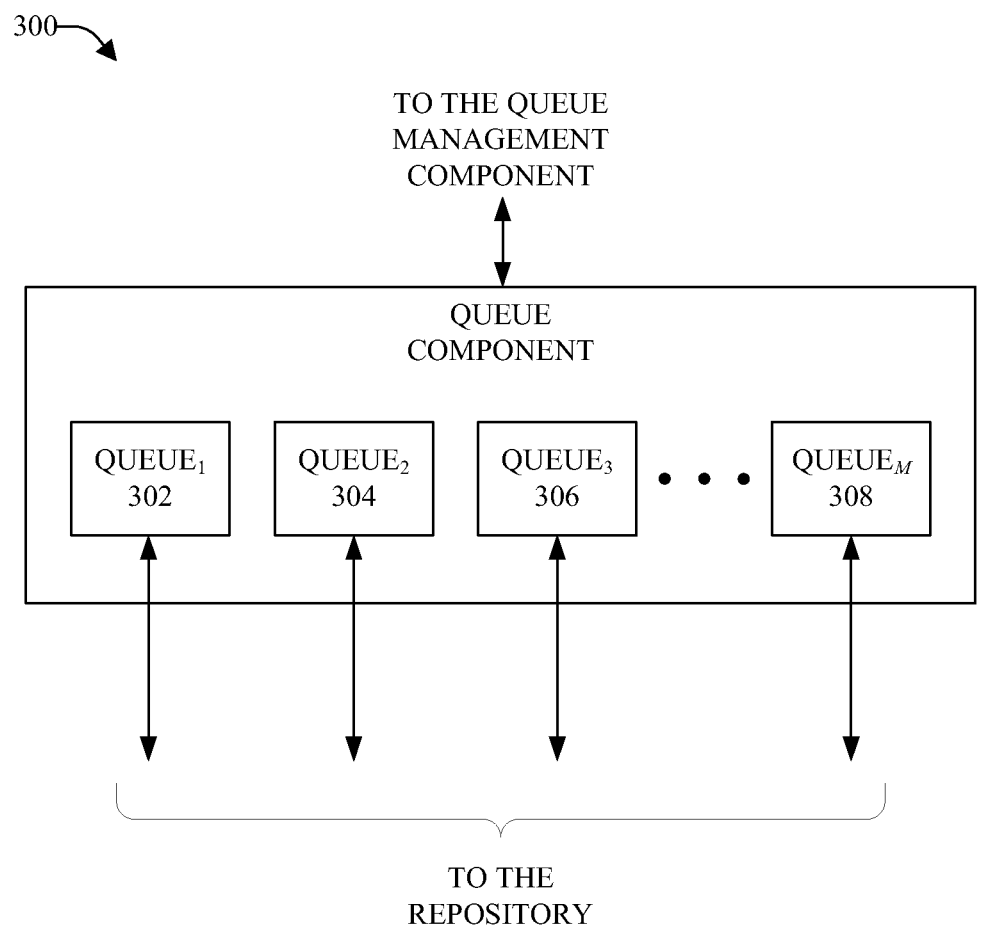
FIG. 3 depicts a block diagram of example queue component that can include a set of queues to facilitate distribution of data segments of data streams to partitions of a repository in accordance with various aspects and implementations of this disclosure.

FIG. 3 illustrates a block diagram of example queue component 300 that can include a set of queues to facilitate distribution of data segments of data streams to partitions of a repository in accordance with various aspects and implementations of this disclosure. In some implementations, the data can include video (or data) patterns or structures, such as digital video fingerprints, associated with digital media content. The queue component 300 can include a set of queues, such as, for example, queue$_1$ 302, queue$_2$ 304, queue$_3$ 306, up through queue$_M$ 308. M can be an integer number that can be the same as or different from the number N, which can define a number of partitions of the repository. While the queue component 300 is depicted as having a plurality of queues, M can be a desired integer number that is one or greater than one, in accordance with various implementations. In certain implementations, the set of queues can include multiple queues that can operate sequentially or in parallel to queue and distribute data segments of data streams. The queues of the set of queues can be physical or logical queues.

In some implementations, the number of queues M can be adjusted (e.g., increased, decreased) based at least in part on (e.g., in response to) a change (e.g., increase, decrease) in the number of partitions N of the repository. For example, a queue management component can modify the number of queues M of the queue component 300 in response to a change in the number of partitions N of the repository.

Figure 4:
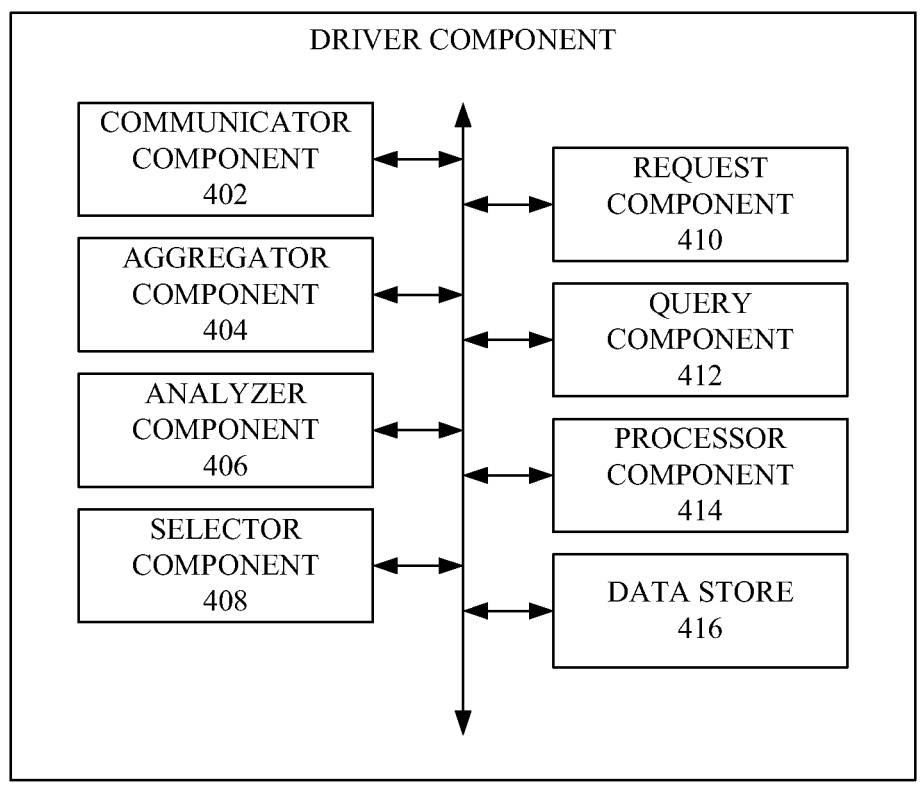
FIG. 4 illustrates a block diagram of an example driver component in accordance with various aspects and implementations of this disclosure.

FIG. 4 illustrates a block diagram of an example driver component 400 in accordance with various aspects and implementations of this disclosure. The driver component 400 can operate in a stateless manner. As a result, the driver component 400 can recover relatively quickly (e.g., after a network communication disruption, after a maintenance or repair operation is performed, etc.) and can be replicated virtually as many times as desired (e.g., needed). The driver component 400 can include a communicator component 402, an aggregator component 404, an analyzer component 406, and a selector component 408.

The communicator component 402 can be used to communicate (e.g., transmit, receive) information between the driver component 400 and other components (e.g., a repository, a client, a queueing system, etc.). The information can include, for example, a request for a data stream from a client, a query to the repository to request data segments of a data stream, data segments of data streams, information (e.g., metadata) associated with data segments of data streams, etc. The driver component 400 can use the information, for example, to facilitate providing a data segment, comprising a plurality of data segments, to a client in response to a request for the data segment from a client. The data can include, for example, video (or data) patterns or structures, such as digital video fingerprints, associated with digital media content (e.g., streamed video or audio content).

The aggregator component 404 can aggregate data received (e.g., obtained) from various entities (e.g., repository, queueing system, processor(s), data store(s), etc.). The aggregator component 404 can correlate respective items of data based at least in part on type of data (e.g., content, metadata, etc.), stream ID, segment number, source of the data, time or date the data was generated or received, etc., to facilitate analyzing of the data by the analyzer component 406. For example, the aggregator component 404 can aggregate various data segments in relation to their respective data streams based at least in part on the respective stream IDs associated with the various data segments to facilitate reproducing one or more data streams for delivery to one or more clients.

The analyzer component 406 can analyze data to facilitate processing requests for a data stream from a client, generating queries to obtain data segments of a data stream, identifying and aggregating data segments of a data stream, reproducing a data stream from a plurality of data segments, etc., and can generate analysis results, based at least in part on the data analysis. For example, the analyzer component 406 can analyze information relating to various data segments to facilitate aggregating data segments of a data stream with each other.

The selector component 408 can select items of data (e.g., data segments), an applicable data processing algorithm (e.g., data-segment aggregation algorithm, etc.), data-stream-related parameter values, or other information, to facilitate aggregating data segments and reproducing a data stream from those segments for delivery to a client, etc. For example, the selector component 408 can select a plurality of data segments associated with a data stream and/or other information related to the data stream to facilitate reproducing the data stream.

The driver component 400 also can include a request component 410 and a query component 412. The request component 410 can receive requests for data streams from one or more clients associated with the driver component 400. The request component 410 can identify information relating to a request for a data stream, such as a client ID, a destination for delivery of the requested data stream, the data stream being requested by the client, etc.

The query component 412 can generate one or more queries to obtain data segments of a data stream (e.g., requested by a client). The query component 412 (e.g., via the communicator component 402) can distribute queries across the partitions of the repository to request that the partitions provide the data segments of the data stream to the driver component 400. The queries can include information, including the stream ID, that can enable the partitions of the repository to identify the data segments being requested by the query component 412.

In some implementations, the driver component 400 also can include a processor component 414 that can operate with the other components (e.g., communicator component 402, aggregator component 404, analyzer component 406, etc.) to facilitate performing the various functions of the driver component 400. The processor component 422 can employ one or more processors, microprocessors, or controllers that can process data, such as information relating to requests for data streams from clients, querying partitions for data segments of a data stream, aggregating query results (e.g., returned data segments), reproducing data stream, information relating to other operations of the driver component 400, and/or other information, etc. This processing of data by the processor component 414 can facilitate enabling the driver component 400 to process requests for data streams from clients, query partitions for data segments, aggregate query results, reproduce data streams, provide requested data streams to clients, and/or perform other operations associated with the driver component 400, as more fully disclosed herein. The processor component 414 can control or manage data flow between the driver component 400 and other components (e.g., repository and its partitions, clients, queueing system, data store, computer-readable storage media, etc.) associated with the driver component 400.

The driver component 400 also can include a data store 416 that can store data structures (e.g., user data, video (or data) patterns or structures (e.g., digital video fingerprints) representative of video content (e.g., video streams), metadata), instructions, procedures, and/or code structure(s) (e.g., modules, objects, hashes, classes) to facilitate performing or controlling operations associated with the driver component 400. The data store 416 also can store information (e.g., query algorithm, segment-aggregation algorithm, parameter settings, etc.) relating to processing data, querying partitions of a repository to obtain data segments, aggregating data segments, reproducing data streams, and/or information relating to other operations of the driver component 400, etc. The storing of such information and providing such information upon request by the data store 416 can facilitate enabling the driver component 400 to perform various operations to obtain data segments of a data stream, reproduce the data stream, provide the data stream to a client, and perform or control other operations, associated with the driver component 400. The processor component 414 can be coupled (e.g., through a memory bus) to the data store 416 in order to store and retrieve information desired to operate and/or confer functionality, at least in part, to the components (e.g., communicator component 402, aggregator component 404, analyzer component 406, etc.) of the driver component 400, and/or substantially any other operational aspects of the driver component 400.

Figure 5:
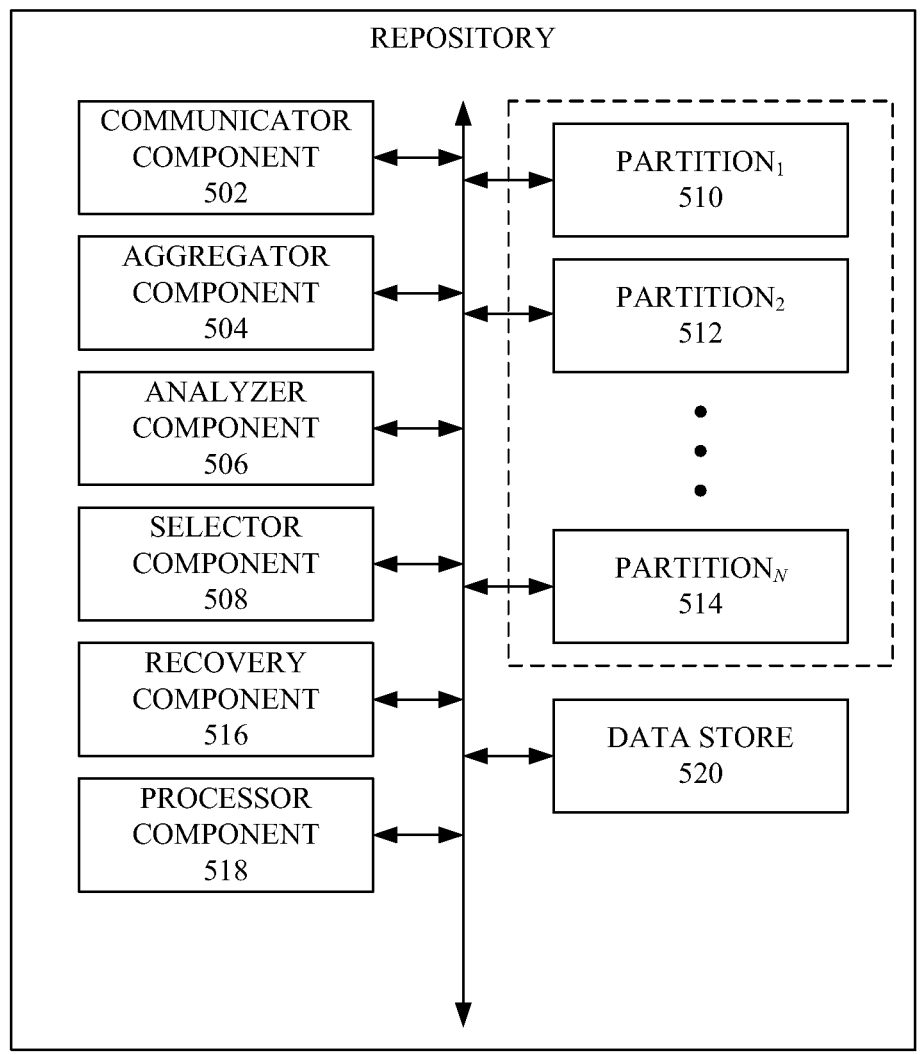
FIG. 5 presents a block diagram of an example repository in accordance with various aspects and implementations of this disclosure.

FIG. 5 depicts a block diagram of an example repository 500 in accordance with various aspects and implementations of this disclosure. The repository 500 can store information, including data segments of data streams. In some implementations, the data can include video (or data) patterns or structures, such as digital video fingerprints, associated with digital media content. The repository 500 can include a communicator component 502, an aggregator component 504, an analyzer component 506, and a selector component 508.

The communicator component 502 can communicate (e.g., transmit, receive) information between the repository 500 and other components (e.g., queueing system, driver component, etc.). The information can include, for example, data segments of data streams, recovery-related requests (e.g., "seek back" requests), query results (e.g., data segments in response to one or more queries), etc.

The aggregator component 504 can aggregate data received (e.g., obtained) from various entities (e.g., queueing system, driver component, processor, data store, etc.). The aggregator component 504 can correlate respective items of data based at least in part on type of data, source of the data, time or date the data was generated or received, segment number and/or stream ID associated with a data segment, routing information (e.g., routing number associated with a data segment), a query or subset of related queries, client information associated with a data stream requested by a client, etc. This can facilitate performing data analysis on the data by the analyzer component 506, storing of data segments in respective partitions of the repository 500, processing of client requests for data streams, etc.

The analyzer component 506 can analyze data to facilitate identifying one or more data segments that are responsive to one or more queries from a driver component, storing data segments in partitions, identifying a specified time period for which re-delivery of data segments is desired, etc., and can generate analysis results, based at least in part on the data analysis. For example, the analyzer component 506 can analyze information relating to a subset of queries for data segments of a data stream that is received from the driver component, and generate analysis results that can indicate which data segments are to be retrieved in order to respond to the subset of queries.

The selector component 508 can select items of data (e.g., data segments, metadata associated with data segments, etc.), an applicable storage-related algorithm, an applicable recovery-related algorithm, or other information, to facilitate storing data segments in the partitions (e.g., 510, 512, 514, . . . ) and retrieving data segments from the partitions in response to queries, etc. For example, the selector component 508 can select one or more parameters, one or more items of data, one or more data segments, etc., relevant to a data-segment-related task (e.g., identifying a partition in which to store a data segment, identifying a partition from which to retrieve a data segment, identifying a specified time period associated with a recovery operation, etc.) being performed by the repository 500.

The repository 500 also can include a plurality of partitions, including partition$_1$ 510, partition$_2$ 512, up through partition$_N$ 514, and a recovery component 516. The plurality of partitions (e.g., 510, 512, 514, . . . ) can include respective storage locations in which data, such as data segments and/or associated data (e.g., metadata, segment numbers, stream IDs, etc.), can be stored. Each partition of the plurality of partitions can be associated with a identifier to facilitate distinguishing between partitions of the repository 500. A processor component 518 can adjust the number of partitions N, for example, to add or remove a partition, switch a partition to an offline or unavailable state, switch a partition to an online or available state, etc. For example, if a maintenance or repair operation is to be performed on a partition, the processor component 518 can switch the partition to an offline state while the maintenance or repair operation is being performed on that partition.

The recovery component 516 can generate a recovery-related request (e.g., "seek back" request) to facilitate having one or more data segments redelivered to a partition(s) (e.g., 510, 512, and/or 514, . . . ) by the queueing system, for example, when the partition(s) is again available after being unavailable for a specified period of time. In some implementations, the recovery component 516 can identify (e.g., determine, calculate) the specified period of time for which redelivery of data segments are desired in relation to a partition. For example, the recovery component 516 can determine the specified period of time as the current time of the recovery-related request minus the expiry time of the data stream minus the maximum data stream length.

In some implementations, the repository 500 also can include a processor component 518 that can operate in conjunction with the other components (e.g., communicator component 502, aggregator component 504, analyzer component 506, etc.) to facilitate performing the various functions of the repository 500, as more fully disclosed herein. The processor component 518 can employ one or more processors, microprocessors, or controllers that can process data, such as information relating to storing data segments in partitions, retrieving data segments from partitions, responding to queries, performing recovery-related operations, information relating to other operations of the repository 500, and/or other information, etc. This can enable the repository 500 to process requests for data streams and/or perform other operations associated with the repository 500, as more fully disclosed herein. The processor component 518 also can control or manage data flow between the repository 500 and other components (e.g., queueing system, driver component, computer-readable storage media, etc.) associated with the repository 500.

The repository 500 also can include a data store 520 that can store data structures (e.g., user data, metadata), instructions, procedures, and/or code structure(s) (e.g., modules, objects, hashes, classes) to facilitate performing or controlling operations associated with the repository 500. The data store 520 also can store information (e.g., data segments, segment numbers, stream IDs, repository-related parameters, recovery-related algorithm, etc.) relating to storing data segments in partitions, retrieving data segments from partitions, responding to queries, performing recovery-related operations, and other information relating to other operations of the repository 500. This can facilitate enabling the repository 500 to perform and/or control operations associated with the repository 500. The processor component 518 can be coupled (e.g., through a memory bus) to the data store 520 in order to store and retrieve information desired to operate and/or confer functionality, at least in part, to the components (e.g., communicator component 502, aggregator component 504, analyzer component 506, etc.) of the repository 500, and/or substantially any other operational aspects of the repository 500.

The queueing system 200, driver component 400, and repository 500 have been described herein to have respective communicator components (e.g., 202, 402, 502), aggregator components (e.g., 204, 404, 504), analyzer components (e.g., 206, 406, 506), selector components (e.g., 208, 408, 508), processor components (e.g., 220, 414, 518), data stores (e.g., 222, 416, 520), etc. In some implementations, the queueing system 200, driver component 400, and/or repository 500 can share one or more of these similarly named components (e.g., communicator component, aggregator component, analyzer component, selector component, processor component, data store, etc.).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems, components, and devices described above, example methods that can be implemented in accordance with this disclosure can be further appreciated with reference to flowcharts in FIGS. 6-10. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

Figure 6:
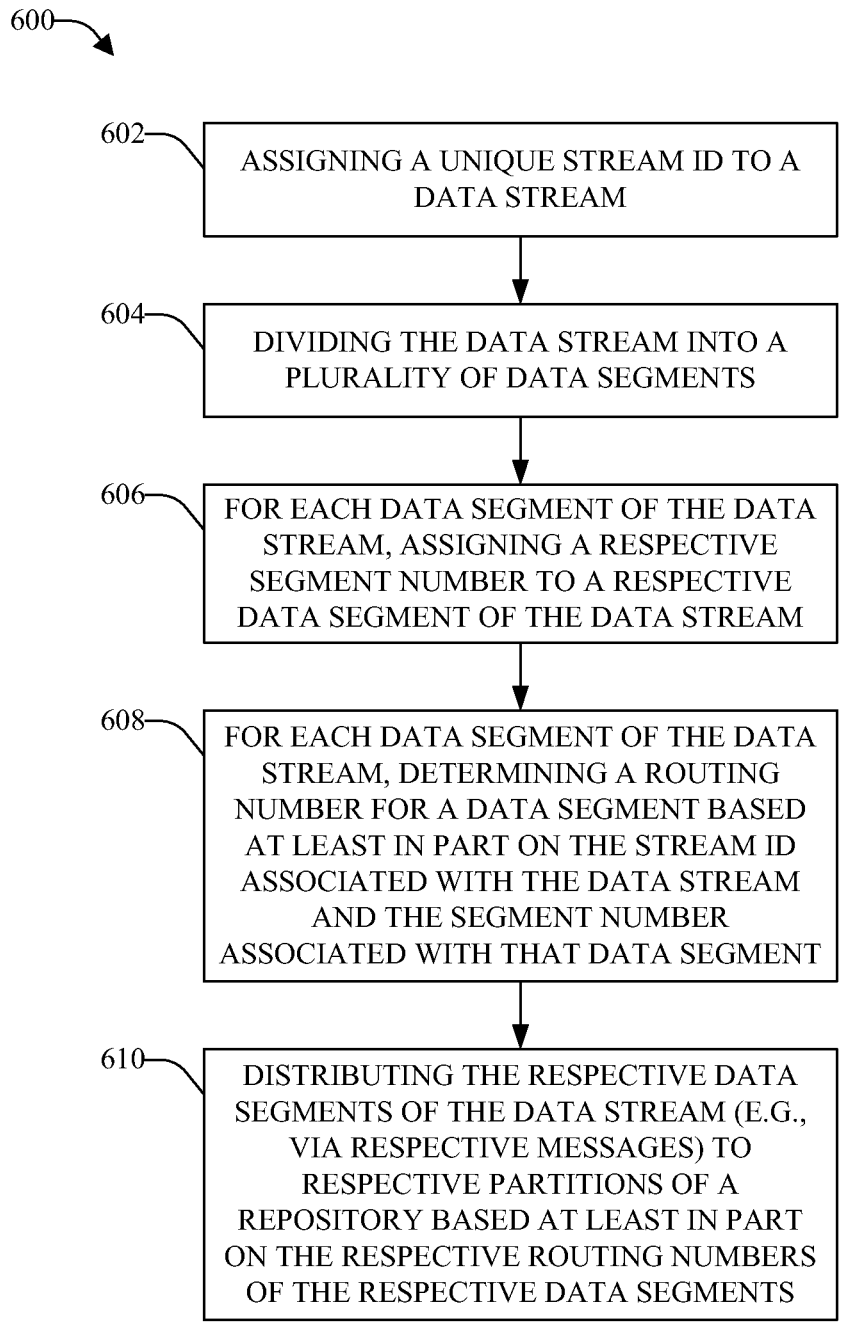
FIG. 6 illustrates a flow chart of an example method for distributing data segments of a data stream to partitions of a repository in accordance with various aspects and implementations described herein.

With reference first to FIG. 6, illustrated is a flow chart of an example method 600 for distributing data segments of a data stream to partitions of a repository in accordance with various aspects and implementations described herein. The method 600 can be used, for example, by a queueing system, which can include a queue component and a queue management component.

At 602, a unique stream ID can be assigned to a data stream. The queue management component can assign or associate (e.g., link) a unique stream ID to the data stream. In some implementations, the data stream can be a unique video (or data) pattern, structure, or characteristic(s), such as a digital video fingerprint(s), associated with digital video content (e.g., digital video or audio stream).

At 604, the data stream can be divided into a plurality of data segments (e.g., by the queue management component). At 606, for each data segment of the data stream, a respective segment number can be assigned to a respective data segment of the data stream (e.g., by the queue management component). The queue management component can assign or associate (e.g., link) respective segment numbers to respective data segments of the data stream.

At 608, for each data segment of the data stream, a routing number can be determined for a data segment based at least in part on the stream ID associated with the data stream and the segment number associated with that data segment. The queue management component can determine the routing number for a data segment using a randomizing function based at least in part on the stream ID associated with the data stream and the segment number associated with that data segment. The queue management component can associate (e.g., assign, map, etc.) respective routing numbers with the respective data segments of the data stream.

At 610, the respective data segments of the data stream can be distributed (e.g., via respective messages) to respective partitions of a repository based at least in part on the respective routing numbers of the respective data segments. The queue management component can generate control information to facilitate distributing respective messages, which can include the respective data segments, among the respective partitions of the repository based at least in part on the respective routing numbers of the respective data segments. In accordance with the control information received from the queue management component, the queue component can distribute the respective data segments to the respective partitions of the repository.

Figure 7:
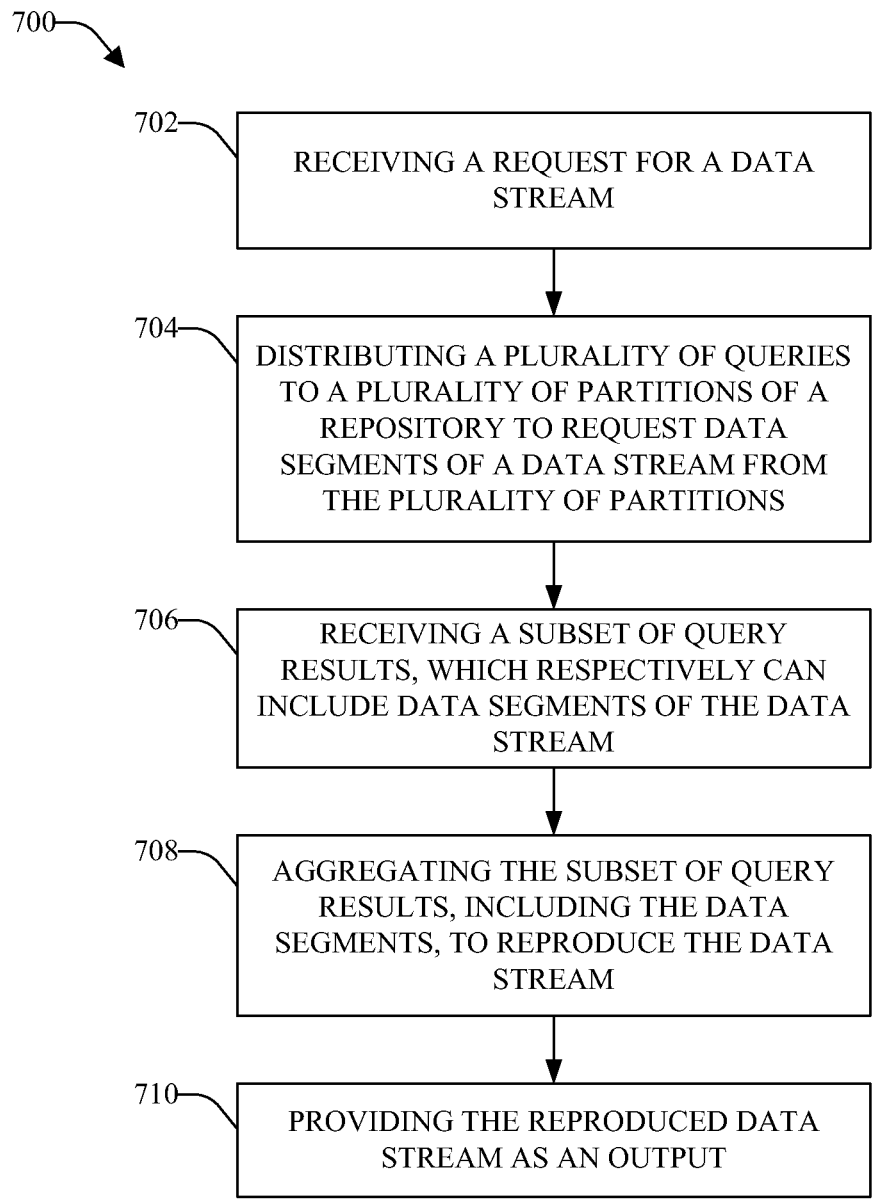
FIG. 7 depicts a flow chart of an example method for obtaining data segments of a data stream from a repository to reproduce the data stream, in accordance with various aspects and implementations.

Referring next to FIG. 7, depicted is a flow chart of an example method 700 for obtaining data segments of a data stream from a repository to reproduce the data stream, in accordance with various aspects and implementations. The method 700 can be used, for example, by a driver component.

At 702, a request for a data stream can be received (e.g., by the driver component from a client). In some implementations, the data can include video (or data) patterns or structures, such as digital video fingerprints, associated with digital media content. At 704, a plurality of queries can be distributed to a plurality of partitions of a repository (e.g., by the driver component) to request data segments of a data stream from the plurality of partitions of the repository.

At 706, a subset of query results, which respectively can include data segments of the data stream, can be received (e.g., by the driver component). The repository can communicate the subset of query results, which can contain all or at least a portion of the data segments of the data stream, to the driver component.

At 708, the subset of query results, including the data segments, can be aggregated to reproduce the data stream. The driver component can aggregate the data segments associated with the subset of query results to reproduce the data stream requested by the client At 710, the reproduced data stream can be provided as an output. The driver component can provide (e.g., communicate) the reproduced data stream to the client.

Figure 8:
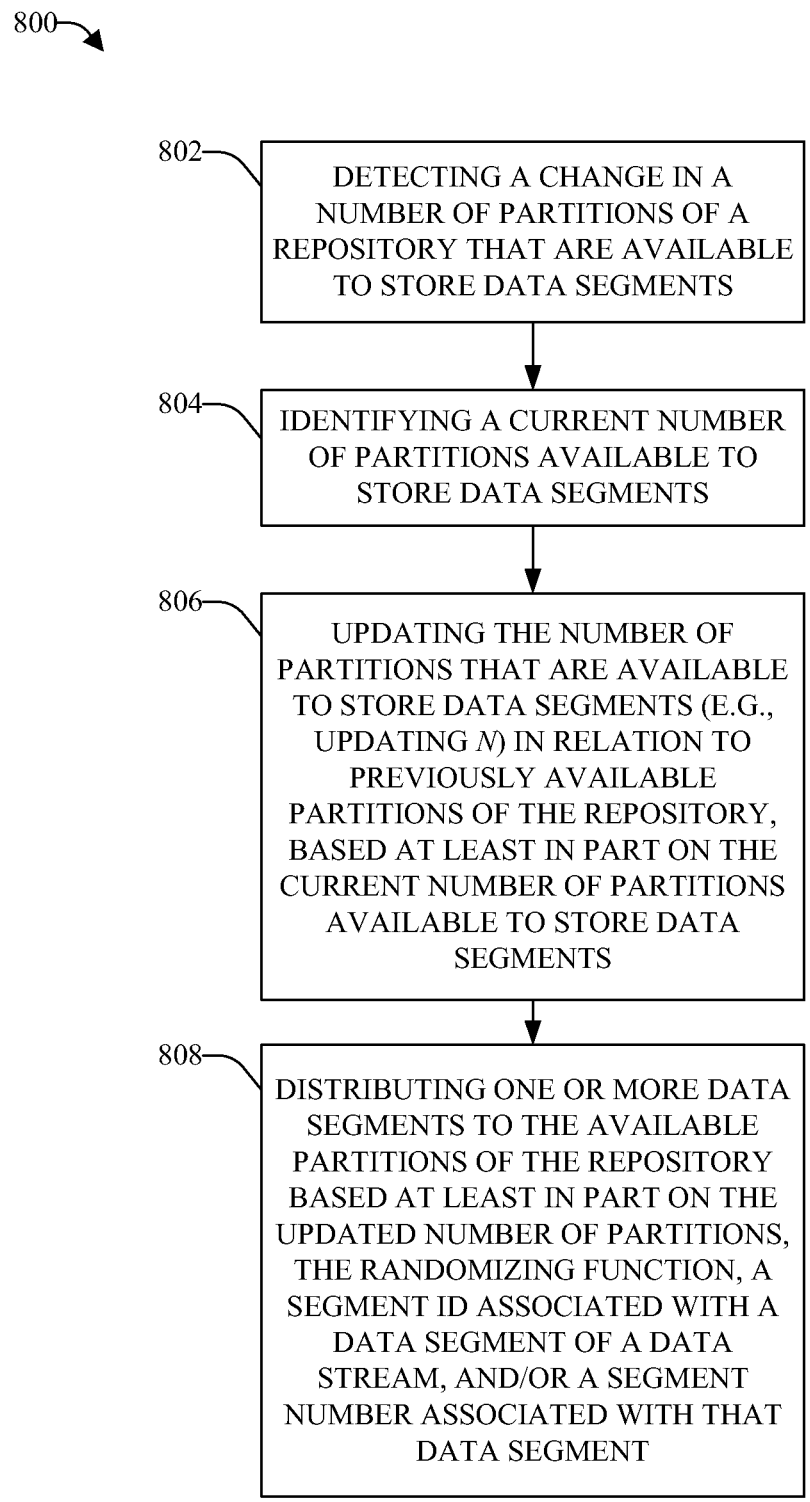
FIG. 8 depicts a flow chart of an example method for updating a number of available partitions of a repository to facilitate distributing data segments across available partitions of the repository, in accordance with various aspects and implementations.

FIG. 8 depicts a flow chart of an example method 800 for updating a number of available partitions of a repository to facilitate distributing data segments across available partitions of the repository, in accordance with various aspects and implementations. The method 800 can be used, for example, by a queue management component and/or a repository.

At 802, a change in a number of partitions of a repository that are available to store data segments can be detected. The queue management component can be associated with (e.g., communicatively connected to) the repository, which can include a plurality of partitions in which data segments of data streams can be stored. The queue management can monitor the repository and can detect a change in the number of partitions of the repository that are available to store data segments. In some implementations, a change in the number of partitions of the repository can be detected manually. A change in the number of partitions can be due to, for example, the repository adding or removing a partition(s) and/or placing a partition in an offline state (e.g., for maintenance or repair) or placing a partition in an online state, or a network outage that renders a partition(s) unavailable to the queue component.

At 804, a current number of partitions available to store data segments can be identified. The queue management component can identify the current number of partitions of the repository that are available to store segments at a given time. At 806, the number of partitions that are available to store data segments can be updated (e.g., N can be updated) in relation to previously available partitions of the repository, based at least in part on the current number of partitions available to store data segments. The queue management component and the repository can operate to update the number of available partitions for the previously available partitions of the repository (e.g., partitions that were previously available to store data segments prior to the detected change in the number of available partitions) to indicate the current number of partitions available to store data segments. This can obviate the need to rebuild the in-memory index associated with the repository to account for the change in the number of available partitions. In accordance with this disclosure, the queue management component and repository can operate to update (e.g., automatically and/or dynamically) the in-memory index in real time.

At 808, one or more data segments can be distributed to the available partitions of the repository based at least in part on the updated number of partitions, the randomizing function, a segment ID associated with a data segment of a data stream, and/or a segment number associated with that data segment. The queue component can distribute the one or more data segments to the currently available partitions.

Figure 9:
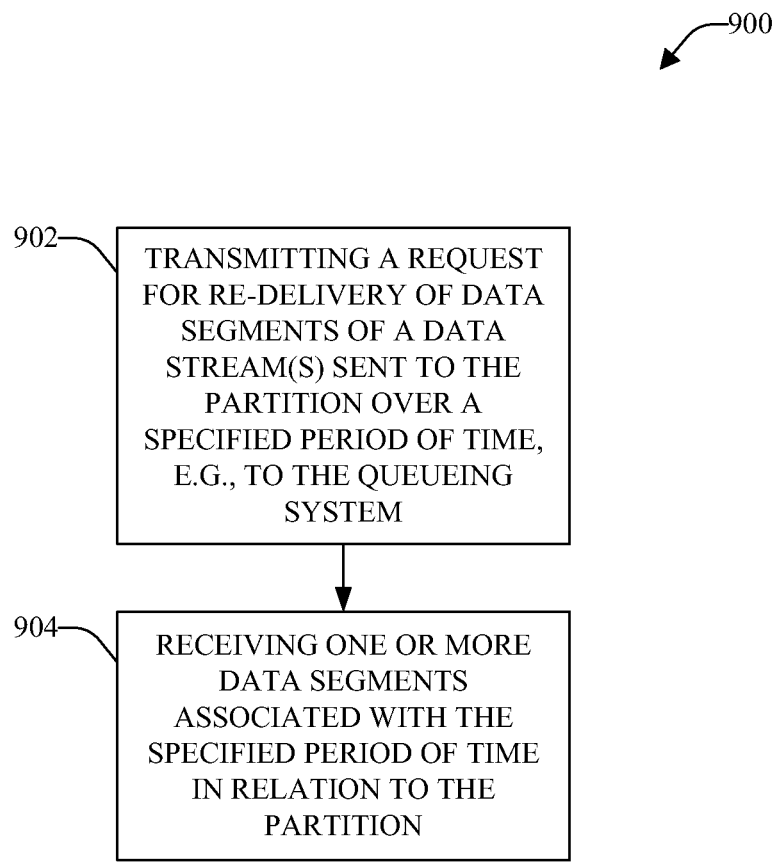
FIG. 9 illustrates a flow chart of an example method for performing recovery of a partition of a repository, in accordance with various aspects and implementations of this disclosure.

FIG. 9 illustrates a flow chart of an example method 900 for performing recovery of a partition of a repository, in accordance with various aspects and implementations of this disclosure. The method 900 can be used, for example, by a repository (e.g., the repository or a partition of the repository).

At 902, a request for re-delivery of data segments of a data stream(s) sent to the partition over a specified period of time can be transmitted, for example, to the queueing system (e.g., to the queue management component or queue component). The repository, or the partition of the repository, can transmit the request for re-delivery of data segments to the partition over the specified period of time (e.g., a recovery-related request, such as a "seek back" request) to the queueing system, for example, when the partition is again available and going through a recovery after a period of being unavailable. The partition may have been unavailable due to, for example, maintenance or repair being performed on the partition, or a network outage that disrupted communications associated with the partition. In some implementations, the request for re-delivery of the data segments can include information indicating the specified period of time of interest to the partition. In other implementations, the queueing system can identify the specified period of time of interest to the partition based at least in part on results obtained by the queueing system from monitoring the availability status of the partition. The queueing system or the repository (e.g., partition of the repository) can determine the specified period of time, for example, as the current time of the recovery-related request minus the expiry time of the data stream minus the maximum data stream length.

At 904, one or more data segments associated with the specified period of time in relation to the partition can be received (e.g., by the partition). The queueing system can perform a recovery-related operation (e.g., "seek back" operation) to facilitate identifying the one or more data segments. The queue management component and/or the queue component can identify the one or more data segments that were sent (e.g., previously transmitted) to the partition during the specified period of time (e.g., sent later than the current time of the recovery-related request minus the expiry time of the data stream minus the maximum data stream length). The queue component can distribute (e.g., re-distribute) the one or more data segments to the partition, which can receive the one or more data segments.

Figure 10:
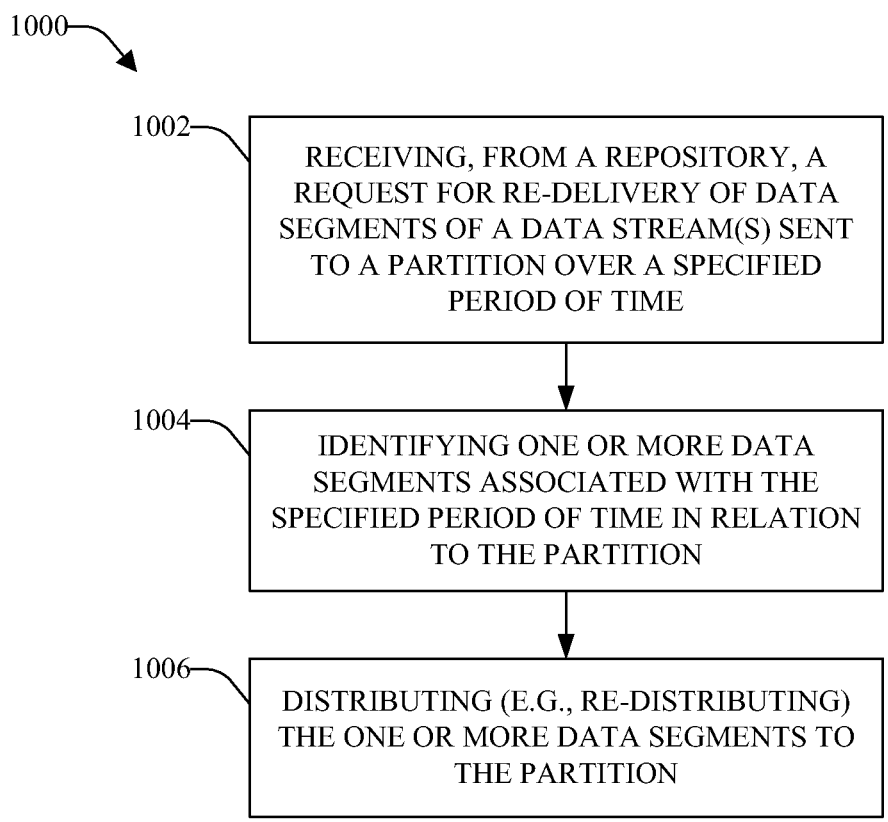
FIG. 10 presents a flow chart of another example method for performing recovery of a partition of a repository, in accordance with various aspects and implementations of this disclosure.

FIG. 10 presents a flow chart of another example method 1000 for performing recovery of a partition of a repository, in accordance with various aspects and implementations of this disclosure. The method 1000 can be used, for example, by a queueing system that can include a queue component and a queue management component.

At 1002, a request for re-delivery of data segments of a data stream(s) sent to the partition over a specified period of time can be received (e.g., by the queueing system) from a repository (e.g., the partition of the repository). The queueing system can receive the request for re-delivery of data segments to the partition over the specified period of time (e.g., a recovery-related request, such as a "seek back" request) from the partition, for instance, when the partition is again available (e.g., in an available or online state) and is going through a recovery after a period of being unavailable. In some implementations, the request for re-delivery of the data segments can include information indicating the specified period of time of interest to the partition. In other implementations, the queueing system can identify the specified period of time of interest to the partition based at least in part on results obtained by the queueing system from monitoring the availability status of the partition. The queueing system or the repository (e.g., partition of the repository) can determine the specified period of time, for example, as the current time of the recovery-related request minus the expiry time of the data stream minus the maximum data stream length.

At 1004, one or more data segments associated with the specified period of time in relation to the partition can be identified. The queueing system can perform a recovery-related operation (e.g., a "seek back" operation) to facilitate identifying the one or more data segments. The queue management component and/or the queue component can identify the one or more data segments that were sent (e.g., previously transmitted) to the partition during the specified period of time (e.g., sent later than the current time of the recovery-related request minus the expiry time of the data stream minus the maximum data stream length).

At 1006, the one or more data segments can be distributed (e.g., re-distributed) to the partition. The queue management component can control operations of the queue component to have the queue component re-deliver the one or more data segments over the specified period of time to the partition of the repository.

Figure 11:
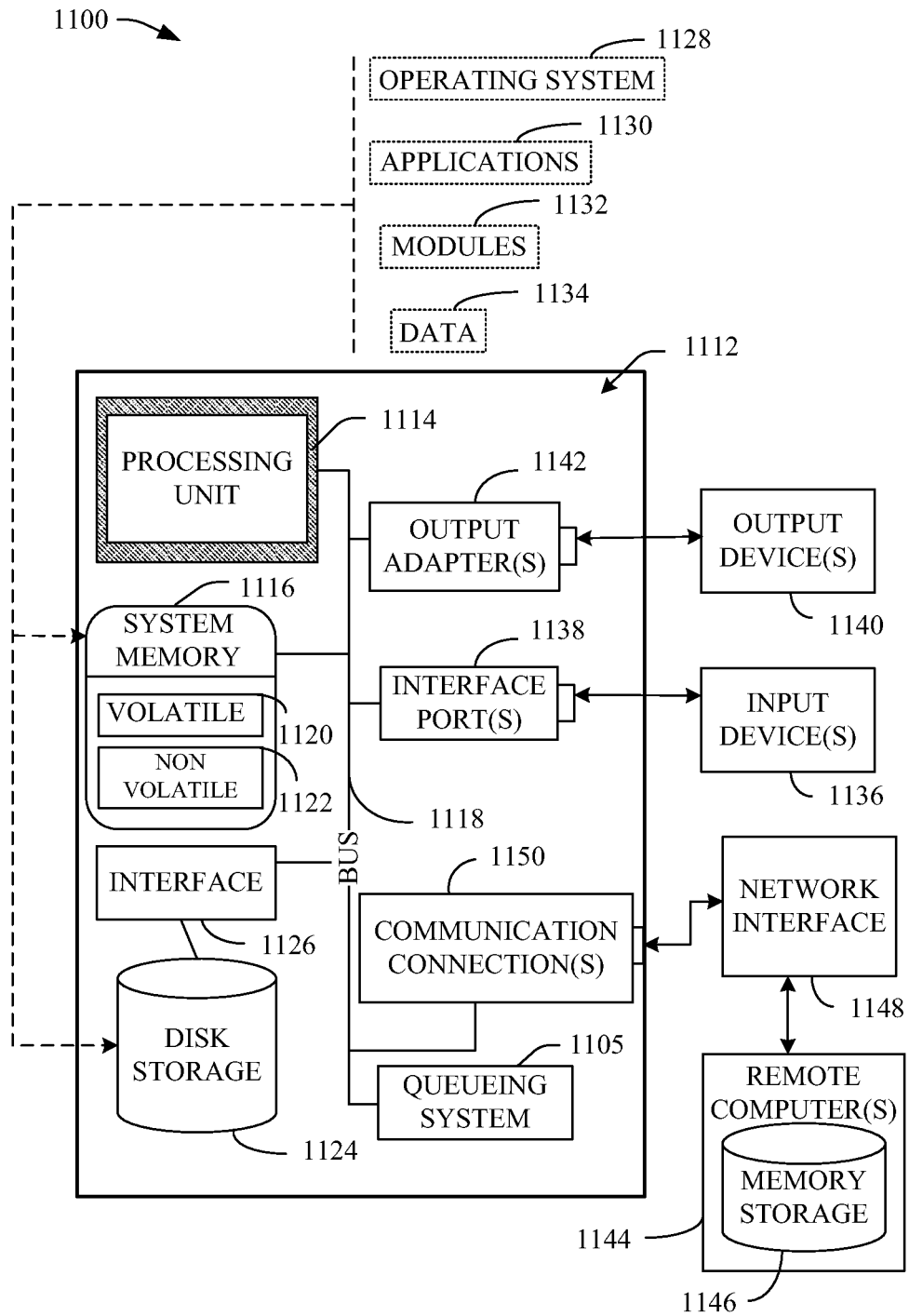
FIG. 11 is a schematic block diagram illustrating a suitable operating environment.
Figure 12:
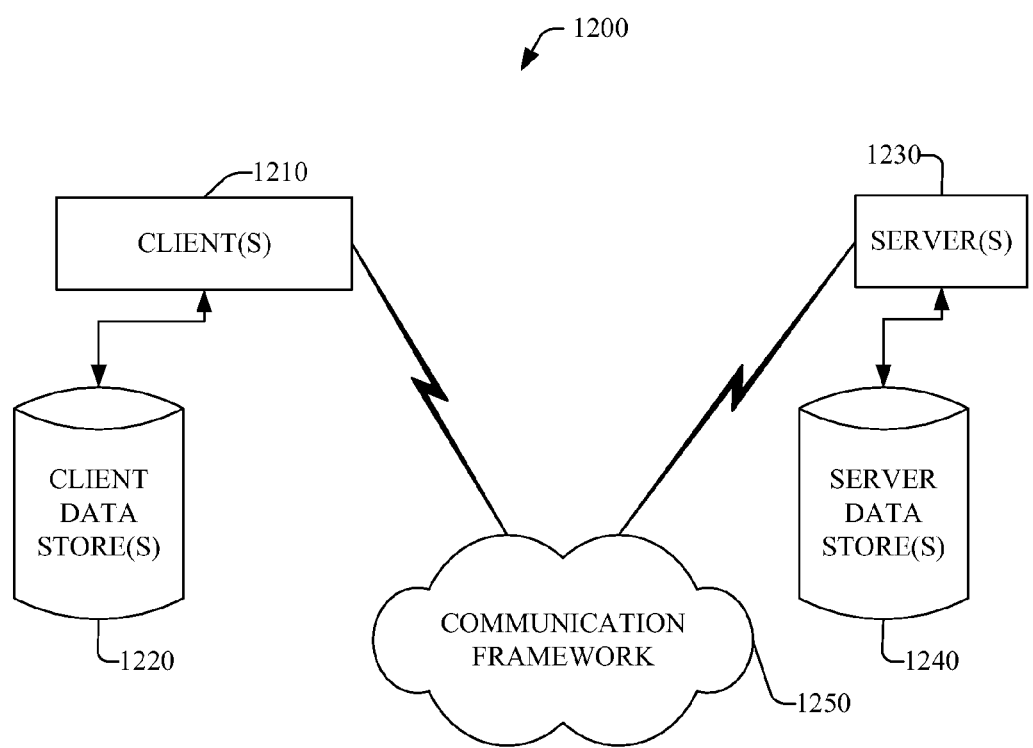
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable operating environment 1100 for implementing various aspects of this disclosure includes a computer 1112. The computer 1112 includes a processing unit 1114, a system memory 1116, and a system bus 1118. It is to be appreciated that the computer 1112 can be used in connection with implementing one or more of the systems or components shown and described in connection with FIGS. 1-5. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

In accordance with various aspects and implementations, the computer 1112 can be used to for processing, storing, distributing, and/or streaming data, such as, for example, video (or data) patterns or structures (e.g., digital video fingerprints) associated with video content (e.g., video streams). As more fully disclosed herein, in some implementations, the computer 1112 can include a plurality of processors that can be used to process data and perform computing tasks (e.g., queueing-system-related tasks, etc.). In certain exemplary embodiments, the computer 1112 includes a queuing system 1105 that can contain, for example, a queue component and/or queue management component, each of which can respectively function as more fully disclosed herein. The queuing system 1105 can perform various data processing tasks (e.g., identifying partitions to distribute data segments, distributing data segments to partitions, performing recovery-related operations, etc.) on data (e.g., sequentially or in parallel). In some implementations, the computer 1112 can contain a driver component (not shown in FIG. 11) and/or a repository (not shown in FIG. 11), each of which can respectively function as more fully disclosed herein.

FIG. 12 is a schematic block diagram of a sample-computing environment 1200 with which the subject matter of this disclosure can interact. The sample-computing environment 1200 includes one or more client(s) 1210. The client(s) 1210 can be hardware and/or software (e.g., threads, processes, computing devices). The sample-computing environment 1200 also includes one or more server(s) 1230. Thus, sample-computing environment 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The sample-computing environment 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be appreciated and understood that components (e.g., queue component, queue management component, repository, partitions, driver component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as Internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone, tablet), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers.

In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," "repository", and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   at least one memory that stores computer executable components; and
   at least one processor that executes the following computer executable components stored in the at least one memory:
      a queue component that distributes respective messages of a plurality of messages to respective partitions of a set of partitions of a repository, wherein the respective messages include respective data segments of a data stream communicated via a data communication network; and
      a queue management component that manages distribution of the respective messages to the respective partitions of the repository based at least in part on respective segment numbers and respective stream identifiers associated with the respective messages, wherein, in response to a recovery-related request for re-delivery of a subset of the respective data segments of the data stream that had been sent to a partition of the set of partitions during a specified period of time, the queue component re-delivers the subset of the respective data segments to the partition to facilitate recovery of the subset of the respective data segments by the partition, wherein the specified period of time is determined as a function of a time of the recovery-related request, a stream expiry time associated with the data stream, and a maximum length of the data stream.

2. The system of claim 1, wherein the respective data segments of the data stream are associated with the respective segment numbers, wherein a segment number of the respective segment numbers identifies a location of a corresponding data segment of the respective data segments in the data stream relative to other data segments of the respective segments.

3. The system of claim 1, wherein a stream identifier of the respective stream identifiers is associated with a data segment of the respective segments and identifies the data stream with which the data segment is associated.

4. The system of claim 1, wherein the queue management component determines a routing number for a data segment associated with a message of the plurality of messages based at least in part on a segment number and a stream identifier associated with the data segment, and assigns distribution of the message to the partition of the set of partitions of the repository based at least in part on the routing number.

5. The system of claim 1, wherein the queue management component adjusts distribution of the respective messages in response to identification of a change in a number of available partitions of the repository.

6. The system of claim 5, wherein, in response to a new partition being added to the set of partitions, the queue management component updates a number indicative of a total number of partitions in the set of partitions in relation to previously existing partitions of the set of partitions.

7. The system of claim 1, further comprising a driver component that distributes queries over the respective partitions of the set of partitions to obtain the respective data segments stored in the respective partitions, and aggregates the respective data segments of the data stream in a segment order, based at least in part on the respective segment numbers, to facilitate providing the data stream to a client.

8. The system of claim 7, wherein the driver component is stateless and is replicated in response to demand.

9. The system of claim 1, wherein the repository maintains one or more data streams, including the data stream, for a defined period of time, wherein the repository determines the stream expiry time of the data stream based at least in part on a time when a last data segment of the data stream was received by the repository.

10. The system of claim 1, wherein the partition of the set of partitions, to facilitate the recovery of the subset of the respective data segments of the data stream when the partition is available after being unavailable, generates the recovery-related request and transmits the recovery-related request to the queue component to request that the queue component re-deliver the subset of the respective data segments that were sent during the specified period of time, wherein the specified period of time is determined based at least in part on the time of the recovery-related request minus the stream expiry time associated with the data stream minus the maximum stream length of the data stream.

11. A method, comprising:
    employing at least one processor to facilitate execution of code instructions retained in at least one memory device, the at least one processor, in response to execution of the code instructions, causing a device to perform operations comprising:
       distributing respective messages of a plurality of messages via a queue to respective partitions of a plurality of partitions of a repository, wherein the respective messages include respective data segments of a data stream that is communicated via a communication network;
       controlling distribution of the respective messages to the respective partitions of the repository as a function of respective segment numbers and respective stream identifiers of the respective messages; and
       in response to a request to re-send a subset of the respective data segments of the data stream that had been sent to a partition of the plurality of partitions during a specified period of time, transmitting the subset of the respective data segments to the partition to facilitate recovery by the partition, wherein the specified period of time is determined based at least in part on a time of the request, a stream expiration time associated with the data stream, and a value that is based on a defined data stream length associated with the data stream.

12. The method of claim 11, further comprising:
    linking the respective segment numbers to the respective data segments of the data stream, wherein a segment number of the respective segment numbers identifies a location of a corresponding data segment of the respective data segments in the data stream in relation to other data segments of the respective segments.

13. The method of claim 11, further comprising:
    linking a stream identifier associated with the data stream to the respective data segments of the data stream to facilitate identifying the respective data segments as being associated with the data stream.

14. The method of claim 11, further comprising:
    determining a routing number for a data segment associated with a message of the plurality of messages as a function of a segment number and a stream identifier associated with the data segment; and assigning distribution of the message to the partition of the plurality of partitions of the repository as a function of the routing number.

15. The method of claim 11, further comprising:
adjusting distribution of the respective messages to a subset of the respective partitions in response to identifying a change in a number of available partitions of the repository.

16. The method of claim 11, further comprising:
communicating queries to the respective partitions of the plurality of partitions to obtain a portion of the respective data segments; and
aggregating the portion of the respective data segments of the data stream in a segment order, based at least in part on the respective segment numbers of the respective data segments in the portion of respective data segments, to provide at least a portion of the data stream to a client.

17. The method of claim 11, further comprising:
replicating a driver in response to demand, wherein the driver facilitates aggregating at least a portion of the respective data segments of the data stream in a segment order, based at least in part on the respective segment numbers of the respective data segments in the portion of respective data segments.

18. The method of claim 11, further comprising:
maintaining one or more data streams, including the data stream, in the repository for a defined period of time; and
identifying the stream expiration time of the data stream as a function of a time when a last data segment of the data stream was received by the repository to facilitate the maintaining of the data stream in the repository for the defined period of time.

19. The method of claim 11, further comprising:
receiving the request; and
executing a recovery-related operation to identify the subset of the respective data segments for re-sending to the partition, wherein the subset of the respective data segments were previously sent to the partition during the specified period of time, to facilitate recovering the subset of the respective data segments of the data stream by the partition when the partition becomes available after being unavailable.

20. A computer program product, comprising:
a non-transitory computer-readable storage medium storing computer-executable instructions that, in response to execution, cause a system including at least one processor to perform operations, comprising:
providing respective messages of a plurality of messages via a queue to respective partitions of a plurality of partitions of a repository, wherein the respective messages include respective data segments of a data stream that is received over a data communication network;
managing distribution of the respective messages to the respective partitions of the repository as a function of respective segment numbers and respective stream identifiers associated with the respective data segments; and
in response to a request to re-send a subset of the respective data segments of the data stream that had been sent to a partition of the plurality of partitions during a defined period of time, sending the subset of the respective data segments to the partition to facilitate recovery by the partition, wherein the defined period of time is determined as a function of a time the request is made, a stream expiry time associated with the data stream, and a value that is based on a defined length associated with the data stream.

\* \* \* \* \*